United States Patent
Ansari et al.

(10) Patent No.: US 10,741,836 B1
(45) Date of Patent: Aug. 11, 2020

(54) METAL HALIDE-SILICON COMPOSITES USING ZINTL SALTS FOR SILICON ANODE BATTERIES

(71) Applicant: Enevate Corporation, Irvine, CA (US)

(72) Inventors: Younes Ansari, Irvine, CA (US); Benjamin Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 16/750,233

(22) Filed: Jan. 23, 2020

Related U.S. Application Data

(60) Provisional application No. 62/951,898, filed on Dec. 20, 2019.

(51) Int. Cl.
| | |
|---|---|
| *H01M 4/134* | (2010.01) |
| *H01M 4/38* | (2006.01) |
| *H01M 4/62* | (2006.01) |
| *H01M 10/0525* | (2010.01) |
| *H01M 4/36* | (2006.01) |
| *H01M 4/1395* | (2010.01) |

(52) U.S. Cl.
CPC ......... *H01M 4/386* (2013.01); *H01M 4/1395* (2013.01); *H01M 4/364* (2013.01); *H01M 4/621* (2013.01); *H01M 10/0525* (2013.01)

(58) Field of Classification Search
CPC ...... H01M 4/386; H01M 4/621; H01M 4/364; H01M 4/1395; H01M 10/0525
See application file for complete search history.

(56) References Cited

FOREIGN PATENT DOCUMENTS

CN         108199030    *  6/2018  ............ H01M 4/362

OTHER PUBLICATIONS

Machine translation of CN 108199030, retrived from ,www.espacenet.com>, on Mar. 27, 2020.*

* cited by examiner

*Primary Examiner* — Cynthia K Walls
(74) *Attorney, Agent, or Firm* — McAndrews, Held & Malloy, Ltd.

(57) ABSTRACT

Systems and methods are disclosed that provide for a silicon-carbon composite material that includes nanoparticulate (e.g., nanocrystalline) silicon derived from a reaction between a zintl salt and metal halide. The nanoparticulate silicon-carbon composite material can be used to provide electrode materials (e.g., anode) and cells.

30 Claims, 6 Drawing Sheets

METAL HALIDE-SILICON COMPOSITES USING ZINTL SALTS FOR SILICON ANODE BATTERIES

CROSS-REFERENCE TO RELATED APPLICATIONS/INCORPORATION BY REFERENCE

This application claims priority to U.S. Provisional Patent Application Ser. No. 62/951,898 filed Dec. 20, 2019, and which is incorporated herein by reference in its entirety.

FIELD

Aspects of the present disclosure relate to energy generation and storage. More specifically, certain embodiments of the disclosure relate to a method and system that provide for conductive materials that include a combination of silicon nanoparticles, silicon microparticles, and metal salts and use thereof in electrode materials.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for producing a metal halide silicon-carbon composite material from nanoparticulate (e.g., nanocrystalline) silicon for use in electrode materials (e.g., anode), cells comprising the nanoparticulate silicon carbon composite material, and electrodes comprising the nanoparticulate silicon carbon composite material, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
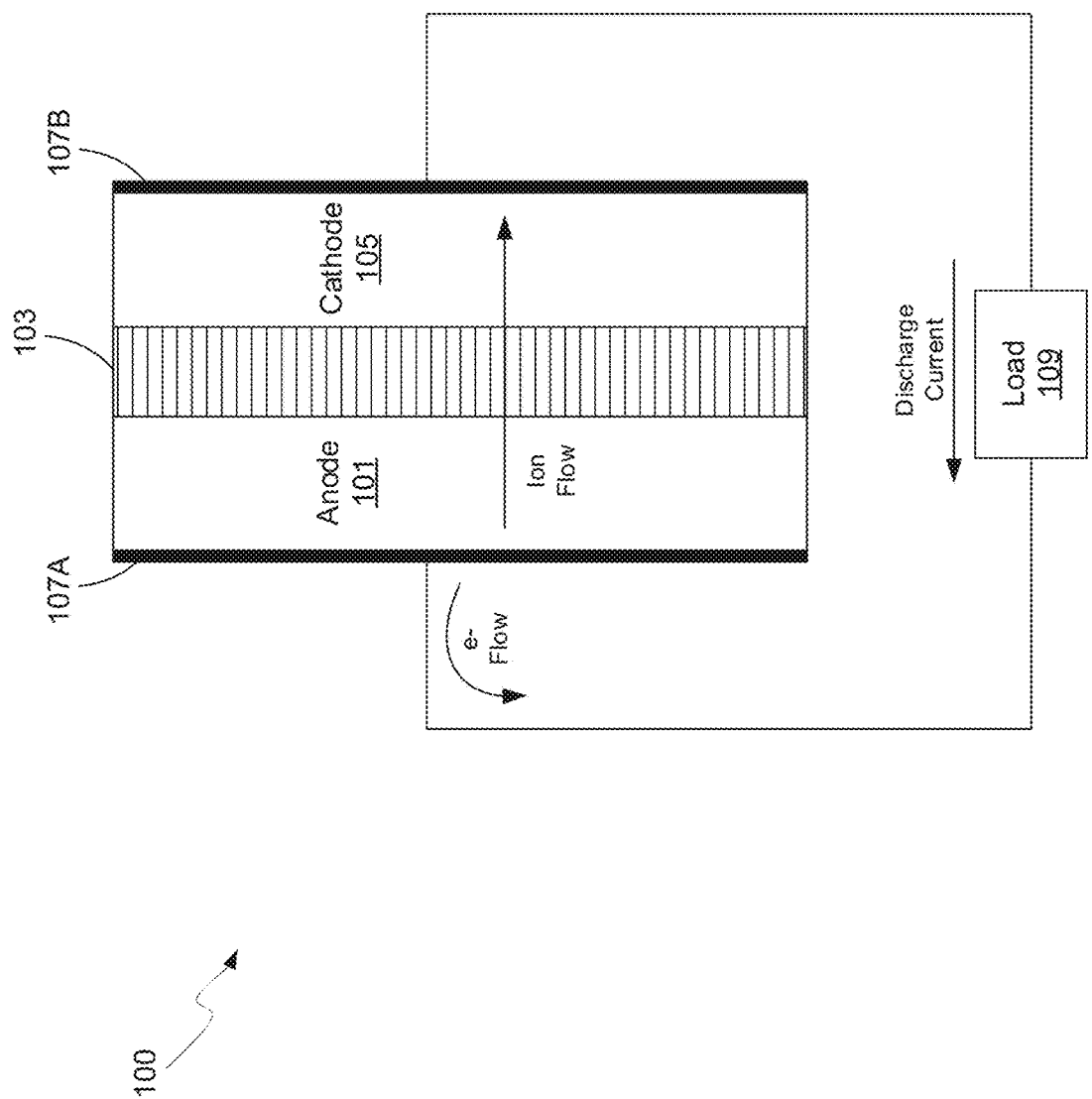
FIG. 1 is a diagram of a battery with anode expansion configured via silicon particle size, in accordance with an example embodiment of the disclosure.

FIG. 1 is a diagram of a battery with electrode materials (e.g., anode) that may be generated in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Improvements in the performance, operation, and lifespan of electrodes and batteries are provided by the method and active composite material generally described herein. In some example embodiments, the disclosure relates to methods that provide for metal halide nanoparticulate silicon carbon composite materials that can be incorporated into electrodes (e.g., silicon dominant anodes) and batteries that improve cell resistance and cyclability.

Figure 2:
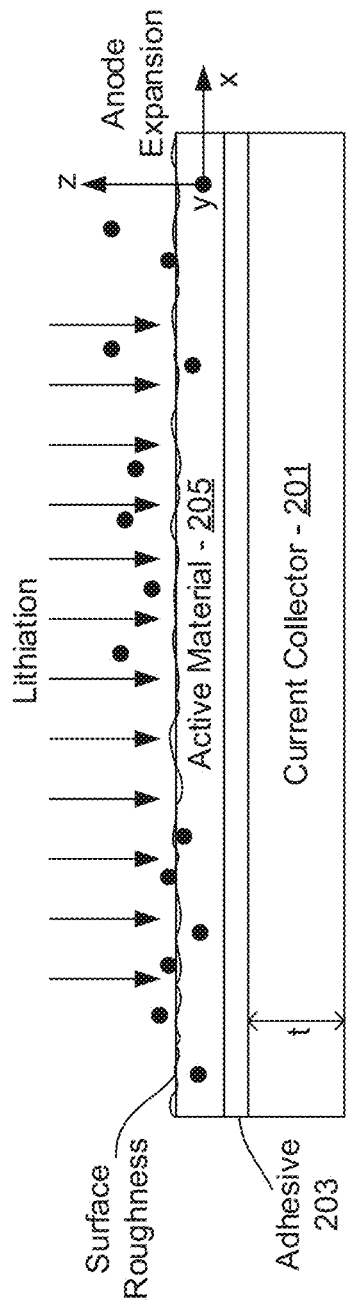
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 µm, such as 10 µm or 20 µm for copper, for example, while thinner foils may be less than 6 µm thick in copper.

In another example scenario, when the current collector 201 is thinner, on the order of 5-6 µm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 µm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Preparation of the Metal Halide-Nanoparticulate Silicon Composite.

Figure 6:
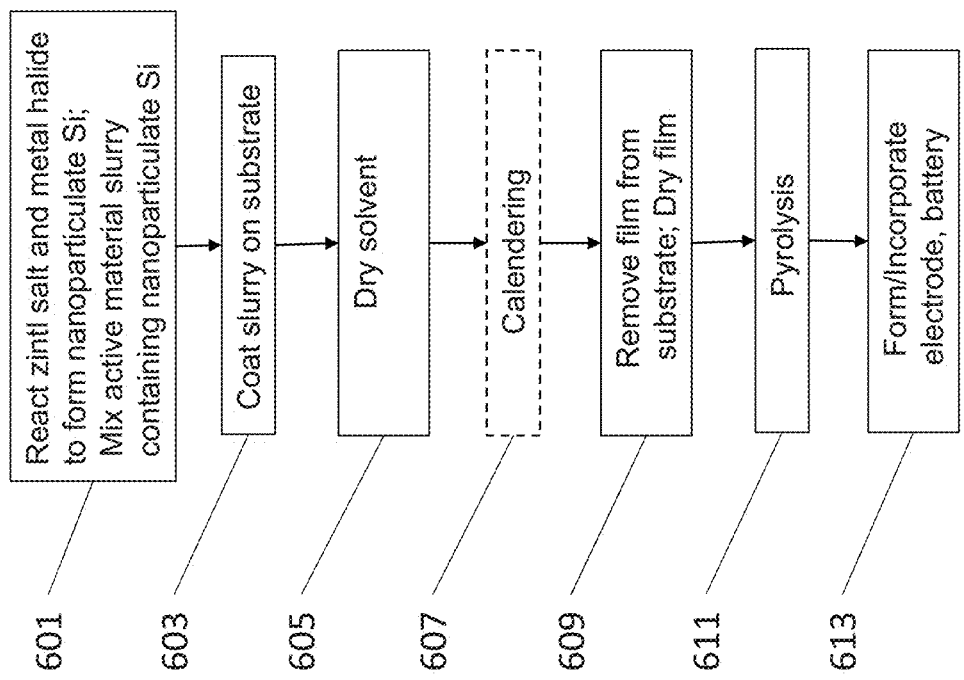
FIG. 6 is an example embodiment of a flow diagram for a process for preparing a nanoparticulate silicon electrode film material in accordance with the disclosure.

As depicted in FIG. 6, the disclosure provides an example embodiment of a process method that may be used in the preparation of the metal halide-nanoparticulate silicon composite material as described herein. Referring to the example process illustrated in FIG. 6, a reaction is performed under conditions that provide for silicon nanoparticles (or nanocrystals). In some embodiments, a zintl salt (e.g., silicon-containing zintl salt) or a silane is reacted with a metal halide (e.g., one or more metal chlorides) or a halosilane (e.g., chlorosilanes, such as tetrachlorosilane) under conditions effective to generate nanoparticulate silicon (or as may be used in the alternative, silicon nanocrystals or nanocrystalline silicon). The nanoparticulate silicon may be mixed with other materials, such as silicon powder (e.g., microparticulate silicon), binder/resin, and/or optionally conductive carbon to prepare an active material slurry 601. The mixture may be prepared as a slurry that can be coated on, or applied to and spread over, a substrate to a desired thickness 603. The slurry may be dried 605 to remove some or all of a solvent that may be present. In step 607, an optional calendering process may be utilized where a series of hard pressure rollers may be used to smooth and/or increase the density of the sheet of material, or to aid in forming a film prior to pyrolysis. In step 609, the film may be removed from the substrate or, if the substrate has low residual char after pyrolysis, the film and substrate may be dried under vacuum and at controlled temperatures (e.g., elevated temperatures to promote removal of residual solvent). The dry film is then pyrolyzed in step 611 (e.g., by heating to 900° C. or more, but no more than about 1250° C., for about 1-3 h.), such that non-conductive carbon precursors are partially or completely converted into pyrolytic carbon. The pyrolysis step may result in an electrode (e.g., anode) active material having silicon content greater than or equal to 50% by weight. The pyrolysis reaction may be performed under a reducing atmosphere (e.g., an inert atmosphere, a vacuum and/or flowing argon, nitrogen, or helium gas).

At this stage, the process provides an electrochemically active metal halide-nanoparticulate silicon carbon composite material that can be readily incorporated into conventional electrode manufacturing processes 613. In example embodiments, the nanoparticulate silicon carbon composite material may be laminated or deposited on a current collector in a manner similar to those used in processes for making a conventional electrode structure (e.g., graphite electrodes, as known in the industry). In further example embodiments, an electrode in a battery or electrochemical cell can include the metal halide-nanoparticulate silicon carbon composite material described herein. For example, the metal halide-nanoparticulate silicon carbon composite material can be used for the anode and/or cathode. In some example embodiments, the battery is a lithium ion battery. In some example embodiments, a process of electrode formation comprises a direct lamination, binding, and/or coating process in which the metal halide-nanoparticulate silicon carbon composite material is directly applied to a copper foil using a binder such as CMC, SBR, Sodium Alginate, PAI, PAA, PI and mixtures and combinations thereof. Such example embodiments may comprise flat press or roll press lamination onto the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the metal halide-nanoparticulate silicon carbon composite material may be laminated to the coated copper using a heated hydraulic press (30-70 seconds, 250-350° C., and 3000-5000 psi), thereby forming the finished silicon dominant composite electrode. In another embodiment, the material may be roll-press laminated to the current collector.

The electrode may then be sandwiched with a separator and cathode with electrolyte to form a cell. The cell may be subjected to a formation process, comprising initial charge and discharge steps to lithiate the anode, with some residual lithium remaining.

In an example embodiment of the disclosure, a method and system is described for the preparation of an active metal halide-nanoparticulate silicon carbon composite material that incorporates "additives" (i.e., metal halide, silanes, halosilanes, and zintl salts) relative to a typical silicon carbon composite material. As described and illustrated herein, the addition of such additives to the composite material can improve battery characteristics and performance.

In one example embodiment of the disclosure, a metal halide nanoparticulate silicon carbon composite material is provided, wherein the material comprises microparticulate silicon, nanoparticulate silicon, metal halide, and pyrolyzed carbon. In some example embodiments, the amount of metal halide in the composite material is from about 0.01% to about 20.0% by weight relative to the amount of the microparticulate silicon. In some example embodiments, the amount of nanoparticulate silicon in the composite material is from about 0.01% to about 20.0% by weight relative to the amount of the microparticulate silicon. In some further example embodiments, the metal halide may comprise a chloride such as, for example, $MgCl_2$. In some further example embodiments, the metal halide may comprise $MgCl_2$ wherein at least 50% of the $MgCl_2$ is beta-$MgCl_2$. In yet further example embodiments, the metal halide nanoparticulate silicon carbon composite material comprises $Si_xMg_yCl_z$, wherein x, y, and z are independently selected integer or partial integer values, and wherein the amount of $Si_xMg_yCl_z$ in the composite material is from about 0.01% to about 20.0% by weight relative to the amount of the microparticulate silicon. In some further example embodiments, the metal halide nanoparticulate silicon carbon composite material comprises $Si_xMg_yCl_z$ wherein x ($Si_x$) is greater than 0.2 and less than 0.45, y ($Mg_y$) is greater than 0.25 and less than 0.50, and z ($Cl_z$) is greater than 0.35 and less than 0.60. In some example embodiments, the silicon magnesium chloride is formed from the reaction between a zintl salt and silicon halide (e.g., $SiCl_4$).

In some example embodiments of the metal halide nanoparticulate silicon carbon composite material, the material may comprise microparticulate silicon having a $D_{50}$ size distribution greater than about 1.0 um and up to a size of about 1000 um (e.g., about 1.0, 2.0, 3.0, 4.0, 5.0, 6.0, 7.0, 8.0, 9.0, 10.0, 15.0, 20.0, 25.0 30.0, 35.0, 40.0, 45.0, 50.0, 60.0, 70.0, 80.0, 90.0, 100, 150, 200, 250, 300, 350, 400, 450, 500, 600, 700, 800, 900, or 1,000 um). In some example embodiments the microparticulate silicon may be described as fine particles (e.g., typically from about 1 um to about 50 um). In some example embodiments, the microparticulate silicon may be sourced from any commercially available supplier.

In some example embodiments of the metal halide nanoparticulate silicon carbon composite material, the material may comprise nanoparticulate silicon having a $D_{50}$ size distribution less than about 200 nm (e.g., about 10.0, 15.0, 20.0, 25.0 30.0, 35.0, 40.0, 45.0, 50.0, 60.0, 70.0, 80.0, 90.0, 100, 125, 150, 175, or about 200 nm).

Some example embodiments of the disclosure provide a method of forming a metal halide-nanoparticulate silicon carbon composite material comprising reacting an amount of a silicon zintl salt or a silane, or a combination thereof with an amount of a silicon halide or a metal halide, or a combination thereof under conditions effective to form nanoparticulate silicon; adding an amount of microparticulate silicon and an amount of binder to the nanoparticulate silicon and mixing to form a slurry; coating the slurry on to a substrate; drying the slurry to form a film; and pyrolyzing the film under conditions effective to form the metal halide-nanoparticulate silicon carbon composite material.

In example embodiments, the zintl salt or zintl phase may comprise a silicon-containing compound that may be in the form of a polyanionic salt that may be reacted with a metal halide to generate nanoparticulate or nanocrystalline silicon structures. In some example embodiments, the zintl salt includes anionic or polyanionic silicon units.

In some example embodiments the method may include a silane compound instead of, or in addition to a zintl salt. In some example embodiments a silane compound may include, for example, any silicon compound that comprises four covalently bonded substituent groups (e.g., organosilicons, halosilicons, chlorosilicons, and the like).

In some example embodiments of the method, the zintl salt may comprise $Mg_2Si$ and the silane compound may comprise tetrachlorosilane ($SiCl_4$). In some further example embodiments, the method may comprise reacting a silane ($Si_aH_b$) and a metal halide such as, for example, $MgCl_2$ to form nanoparticulate silicon. In some example embodiments, the method may comprise reacting a silane (e.g., $Si_aH_b$ or tetrachlorosilane) with a metal halide selected from $BaSi_2$, $CaSi_2$, $SrSi_2$, $NbSi_2$, $MoSi_2$, $CrSi_2$, $VSi_2$, $FeSi_2$, $TaSi_2$, and $WSi_2$, and any mixtures or combinations thereof.

In some example embodiments, the method may include an amount of a zintl salt within a range of about 0.01% to about 20.0% by weight relative to the amount of the microparticulate silicon added to the slurry. In some example embodiments, the amount of zintl salt may be about 0.01%, 0.05%, 0.1%, 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5% or 20.0% by weight relative to the amount of the microparticulate silicon.

In some example embodiments, the method may include amounts of the zintl salt and silane at a molar ratio (of zintl salt to silane) that is >0.25 (e.g. 0.25, 0.30, 0.35, 0.40, 0.45, 0.50, 0.55, 0.60, 0.65, 0.70, 0.75, 0.80, 0.85, 0.90, 0.95, 1.0, 2.0, 3.0, 4.0, etc.), and up to a ratio of about 5.0 or 10.0 or more. In some example embodiments the molar ratio of zintl salt to silane may be about 0.3 to 0.5, or about 0.4.

In some example embodiments of the method, the binder (or resin) may comprise a source of non-conductive carbon binder such as CMC, SBR, Sodium Alginate, PAI, PAA, PI and mixtures and combinations thereof. In some additional or alternative example embodiments of the method, the method may further comprise addition of a conductive carbon to the active material slurry. As noted above, some embodiments comprise the addition of a source of conductive carbon.

In some example embodiments of the method, an optional calendering process may be utilized where a series of hard pressure rollers may be used to smooth, increase the density of the sheet of slurry material, and/or to aid in forming a film prior to pyrolysis.

In some example embodiments of the method the reacting of the silicon zintl salt or silane, or a combination thereof with the silicon halide or metal halide, or combination thereof may be performed in a dipolar aprotic solvent. In some example embodiments, the solvent comprises N-Methyl-2-pyrrolidone (NMP).

In example embodiments the disclosure provides a battery comprising: a) an anode comprising metal halide nanoparticulate silicon carbon composite comprising microparticulate silicon; nanoparticulate silicon; metal halide; and pyrolyzed carbon; b) an electrolyte as the medium that transports charge; and c) a cathode. In example embodiments, the anode comprises the metal halide nanoparticulate silicon carbon composite material described or prepared as described in accordance with the disclosure. In some example embodiments, the anode comprises silicon and a metal selected from the group consisting of lithium, sodium, potassium, magnesium, and combinations thereof. In some example embodiments, the battery comprises an anode that is a silicon dominant anode, comprising from about 50% up to about 95% silicon. In some example embodiments, the battery comprises a separator between the anode and cathode. In some further example embodiments, the battery comprises an electrolyte in the separator, the anode, and the cathode. In some further example embodiments, the battery comprises lithium as the active ion.

In example embodiments the disclosure provides an electrode comprising a metal halide nanoparticulate silicon carbon composite material comprising microparticulate silicon; nanoparticulate silicon; metal halide; and pyrolyzed carbon. In example embodiments, the electrode comprises the metal halide nanoparticulate silicon carbon composite material described or prepared as described in accordance with the disclosure. In some example embodiments, the metal halide in the metal halide nanoparticulate silicon carbon composite material comprises $MgCl_2$. In some further example embodiments the $MgCl_2$ comprises 50% or more beta-$MgCl_2$. In some example embodiments, the microparticulate silicon in the metal halide nanoparticulate silicon carbon composite material has a $D_{50}$ size distribution greater than about 1.0 um, and the nanoparticulate silicon in the metal halide nanoparticulate silicon carbon composite material has a $D_{50}$ size distribution less than about 200 nm. In some further example embodiments, the metal halide nanoparticulate silicon carbon composite material further comprises $Si_xMg_yCl_z$, wherein x ($Si_x$) is greater than 0.2 and less than 0.45, y ($Mg_y$) is greater than 0.25 and less than 0.50, and z ($Cl_z$) is greater than 0.35 and less than 0.60. In further example embodiments, the electrode is an anode.

To illustrate an example embodiment of the disclosure, a reaction is performed that generates silicon nanoparticles in situ. For example, an amount of a zintl salt (e.g., $Mg_2Si$, 9.75 g) is dispersed in NMP for about 15 min. An amount of a silicon halide (e.g., $SiCl_4$, 14.625 mL, about 1:1 molar ratio to zintl salt) is added to and reacts with the zintl salt under conditions that provide for the generation of silicon nanocrystals or nanoparticulate silicon, (e.g., with stirring for 1-12 h., in a low moisture or moisture-free environment). The formation of nanoparticulate silicon can be identified by, for example, the reaction mixture turning bright green in color. In some example embodiments, the silicon nanocrystals produced by the reaction can be isolated.

An amount of microparticulate silicon powder (e.g., 705.99 g, 10-20 um particle size) is added to and mixed with the nanoparticulate silicon to evenly disperse the microparticulate silicon powder. To the dispersion an amount of a binder/resin (e.g., 1638 g of polyamic acid resin, 15% solids in NMP) is added and mixed for about 10 min. at 1000 rpm to achieve a slurry viscosity of about 2000-4000 cP (total solids content of about 30%). The slurry is coated onto a substrate (e.g., PET film) at a loading density of about 3.63 g/cm² (with about 15% solvent content) and may be densified using calender processing. The slurry dries to form a green film that may be removed from the substrate, optionally cut into sheets, and vacuum dried in a two-stage process (e.g., 120° C. for 15 h., 220° C. for 5 h.). The dried film is thermally treated (e.g., pyrolyzed at 1175° C.) to convert non-conductive carbon matrix (e.g., polymer, resin, binder) to conductive carbon.

The nanoparticulate silicon carbon composite material is formed and may be laminated (e.g., by a heated hydraulic press, 50 sec., at 300° C. and 4000 psi) to a current collector (e.g., 15 um thick copper foil) that is coated with polyamide-imide (e.g., at a nominal loading of 0.45 mg/cm², applied as a 6% (wt) varnish in NMP, dried 16 h. at 110° C. under vacuum), to form a finished nanoparticulate silicon carbon composite electrode.

Figure 3:
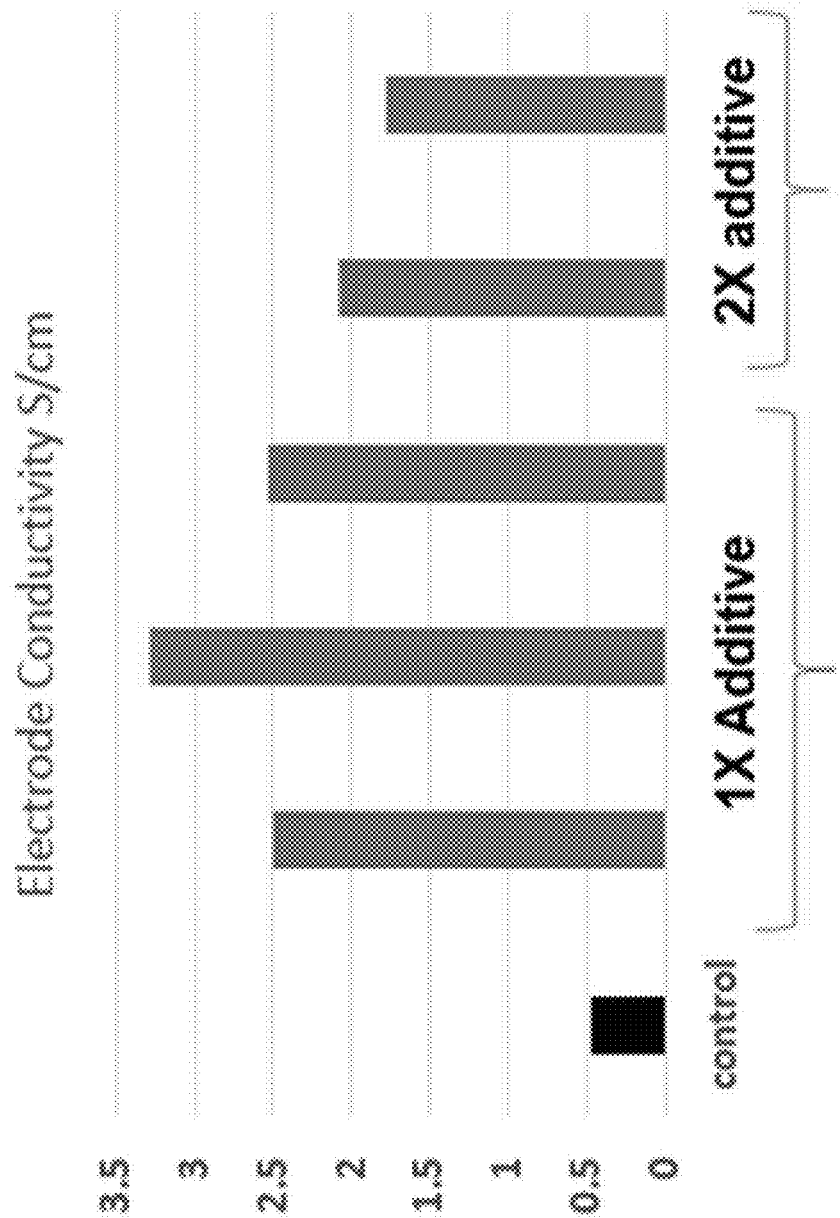
FIG. 3 depicts the conductivity of example embodiments of metal halide nanoparticulate silicon carbon composite anodes including additives in accordance with the disclosure. As shown, in accordance with example embodiments of the disclosure, including amounts of nanoparticulate silicon and metal halide salt additives to standard electrode materials (e.g., anodes) can improve the conductivity relative to control.
Figure 4:
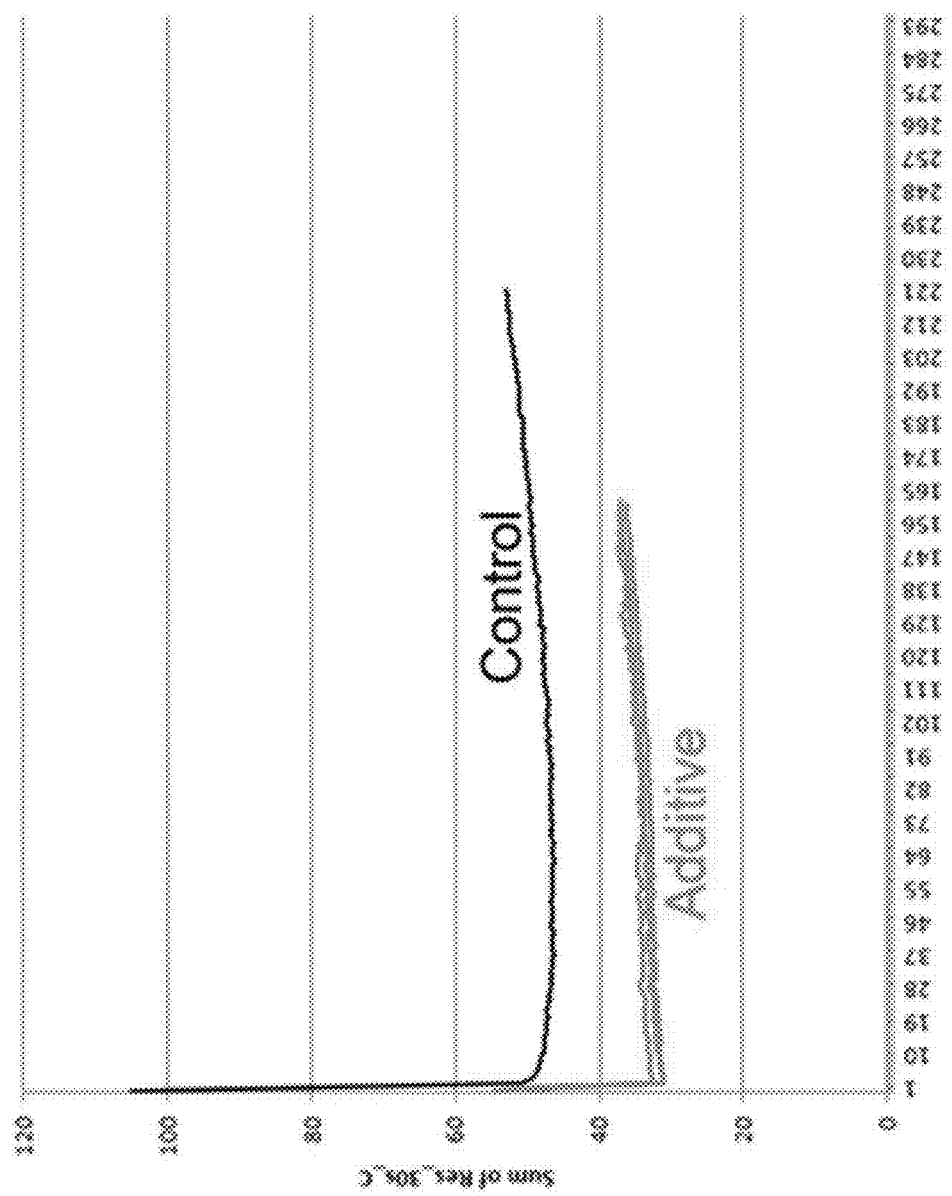
FIG. 4 depicts improvement of the high frequency resistance (in ohms) of a coin-cell battery that includes amounts of additives, in accordance with example embodiments of the disclosure, relative to a control coin-cell battery.
Figure 5:
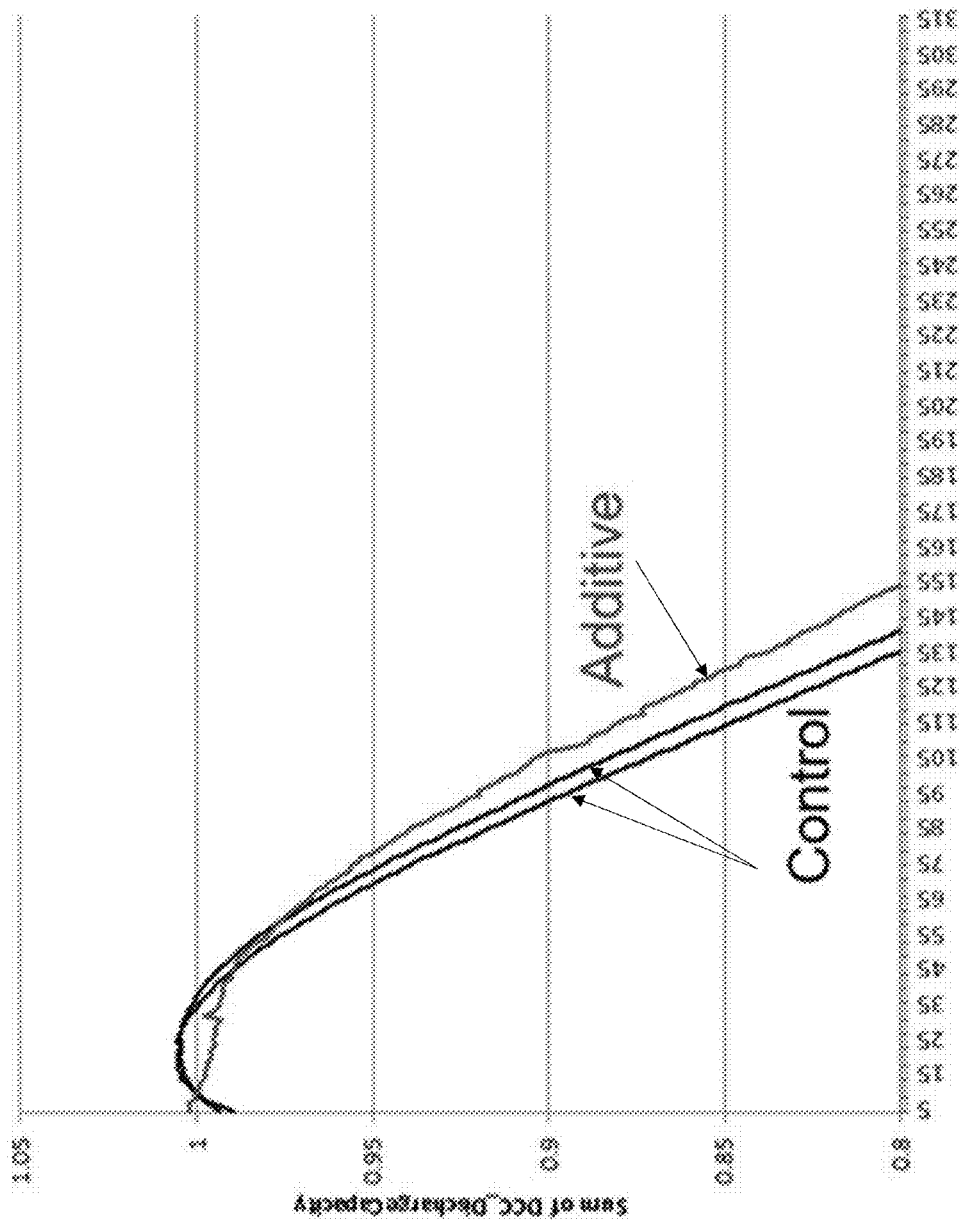
FIG. 5 depicts improvement in galvanic cycling performance of an anode that includes amounts of additives, in accordance with example embodiments of the disclosure, relative to a standard control anode.

The amount of metal halide and/or nanoparticulate silicon can be increased or decreased relative to the amount of microparticulate silicon that is used to produce the nanoparticulate silicon carbon composite material, which may provide electrodes (e.g., anodes) and batteries with modified properties (e.g., conductivities, resistance, and cycling performance). For example, FIG. 3 illustrates electrode conductivity results of example embodiment anodes that comprises metal halide-nanoparticulate silicon carbon composite materials having different amounts of nanoparticulate silicon and metal halide "additive". In accordance with the example embodiments described herein, an electrode that comprises amounts of nanoparticulate silicon and metal halide salt additives relative to standard electrode materials (e.g., anodes) can improve the conductivity. Further, FIG. 4 illustrates the improvement in the high frequency resistance (in ohms) of a coin-cell battery that includes an anode comprising the additive (metal halide and nanoparticulate silicon) composite material, relative to a control coin-cell battery. Cells with the additive show approximately 40% lower resistance than the control which may arise from the presence of metal halide (i.e., in the illustrated embodiment, beta-$MgCl_2$) and nanoparticulate silicon structures. Similarly, FIG. 5 illustrates the improvement in the galvanic cycling performance of an anode having nanoparticulate silicon carbon composite material (where the amount of zintl salt ($Mg_2Si$) and silicon halide ($SiCl_4$) is 3.5% with respect to silicon, and 0.7% with respect to the anode slurry). All these illustrative embodiments serve to demonstrate that including amounts of additives (nanoparticulate silicon and metal halide) can help improve cell cyclability and decrease cell resistance, relative to standard silicon dominant carbon composite electrode materials.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A metal halide-nanoparticulate silicon carbon composite material comprising:
   microparticulate silicon;
   nanoparticulate silicon;
   metal halide; and
   pyrolyzed carbon.

2. The metal halide-nanoparticulate silicon carbon composite material according to claim 1, wherein the amount of metal halide in the composite material is from about 0.01% to about 20.0% by weight relative to the amount of the microparticulate silicon.

3. The metal halide-nanoparticulate silicon carbon composite material according to claim 1, wherein the amount of nanoparticulate silicon in the composite material is from about 0.01% to about 20.0% by weight relative to the amount of the microparticulate silicon.

4. The metal halide-nanoparticulate silicon carbon composite material according to claim 1, wherein the metal halide comprises $MgCl_2$.

5. The metal halide-nanoparticulate silicon carbon composite material according to claim 4, wherein the $MgCl_2$ comprises at least 50% beta-$MgCl_2$.

6. The metal halide-nanoparticulate silicon carbon composite material according to claim 1, wherein the microparticulate silicon has a $D_{50}$ size distribution greater than about 1.0 um.

7. The metal halide-nanoparticulate silicon carbon composite material according to claim 1, wherein the nanoparticulate silicon has a $D_{50}$ size distribution less than about 200 nm.

8. The metal halide-nanoparticulate silicon carbon composite material according to claim 1, wherein the composite material further comprises $Si_xMg_yCl_z$, wherein x is greater than 0.2 and less than 0.45, y is greater than 0.25 and less than 0.50, and z is greater than 0.35 and less than 0.60.

9. The metal halide-nanoparticulate silicon carbon composite material according to claim 8, wherein the amount of $Si_xMg_yCl_z$ in the composite material is from about 0.01% to about 20.0% by weight relative to the amount of the microparticulate silicon.

10. A battery, the battery comprising:
    a) an anode comprising metal halide-nanoparticulate silicon carbon composite comprising:
       microparticulate silicon;
       nanoparticulate silicon;
       metal halide; and
       pyrolyzed carbon;
    b) an electrolyte as the medium that transports charge; and
    c) a cathode.

11. The battery according to claim 10, wherein the amount of metal halide in the metal halide-nanoparticulate silicon carbon composite material is from about 0.01% to about 20.0% by weight relative to the amount of the microparticulate silicon.

12. The battery according to claim 10, wherein the amount of nanoparticulate silicon in the metal halide-nanoparticulate silicon carbon composite material is from about 0.01% to about 20.0% by weight relative to the amount of the microparticulate silicon.

13. The battery according to claim 10, wherein the anode comprises silicon and a metal selected from the group consisting of lithium, sodium, potassium, magnesium, and combinations thereof.

14. The battery according to claim 10, wherein the anode comprises 50% to 95% silicon.

15. The battery according to claim 10, further comprising a separator between the anode and cathode.

16. The battery according to claim 15, further comprising an electrolyte in the separator, the anode, and the cathode.

17. The battery according to claim 10, wherein the active ion is lithium.

18. The battery according to claim 10, wherein the anode comprises metal chlorides, silanes, or chlorosilanes, or combinations thereof.

19. An electrode, the electrode comprising:
    metal halide-nanoparticulate silicon carbon composite material comprising:
    microparticulate silicon;
    nanoparticulate silicon;
    metal halide; and
    pyrolyzed carbon.

20. The electrode according to claim 19, wherein the amount of metal halide in the metal halide-nanoparticulate silicon carbon composite material is from about 0.01% to about 20.0% by weight relative to the amount of the microparticulate silicon.

21. The electrode according to claim 19, wherein the amount of nanoparticulate silicon in the metal halide-nanoparticulate silicon carbon composite material is from about 0.01% to about 20.0% by weight relative to the amount of the microparticulate silicon.

22. The electrode according to claim 19, wherein the metal halide in the metal halide-nanoparticulate silicon carbon composite material comprises $MgCl_2$.

23. The electrode according to claim 22, wherein the $MgCl_2$ comprises 50% or more beta-$MgCl_2$.

24. The electrode according to claim 19, wherein the microparticulate silicon in the metal halide-nanoparticulate silicon carbon composite material has a $D_{50}$ size distribution greater than about 1.0 um.

25. The electrode according to claim 19, wherein the nanoparticulate silicon in the metal halide-nanoparticulate silicon carbon composite material has a $D_{50}$ size distribution less than about 200 nm.

26. The electrode according to claim 19, wherein the metal halide-nanoparticulate silicon carbon composite material further comprises $Si_xMg_yCl_z$, wherein x is greater than 0.2 and less than 0.45, y is greater than 0.25 and less than 0.50, and z is greater than 0.35 and less than 0.60.

27. The electrode according to claim 26, wherein the amount of $Si_xMg_yCl_z$ in the composite material is from about 0.01% to about 20.0% by weight relative to the amount of the microparticulate silicon.

28. A method of forming a metal halide-nanoparticulate silicon carbon composite material, the method comprising:
    reacting an amount of a silicon zintl salt or a silane, or a combination thereof with an amount of a silicon halide or a metal halide, or a combination thereof under conditions effective to form nanoparticulate silicon;
    adding an amount of microparticulate silicon and an amount of binder to the nanoparticulate silicon and mixing to form a slurry;
    coating the slurry on to a substrate;
    drying the slurry to form a film; and
    pyrolyzing the film under conditions effective to form the nanoparticulate silicon carbon composite material.

29. The method according to claim 28, wherein the amount of silicon zintl salt is from about 0.01% to about 20.0% by weight relative to the amount of the microparticulate silicon.

30. The method according to claim 28, wherein the silicon zintl salt comprises $Mg_2Si$ and the metal halide comprises $SiCl_4$.

* * * * *